United States Patent [19]

Schlafer et al.

[11] 3,998,586
[45] Dec. 21, 1976

[54] PROCESS FOR THE DIFFERENTIAL DYEING OF POLYAMIDE FIBERS AND OF MATERIALS CONTAINING THEM

[75] Inventors: Ludwig Schlafer, Fischbach, Taunus; Karl-Heinz Flemmig, Hofheim, Taunus, both of Germany

[73] Assignee: Hoechst Aktiengesellschaft, Frankfurt am Main, Germany

[22] Filed: Aug. 20, 1975

[21] Appl. No.: 606,106

[30] Foreign Application Priority Data

Aug. 22, 1974 Germany .................. 2440208

[52] U.S. Cl. .................. 8/21 B; 8/41 B; 260/194; 260/199
[51] Int. Cl.$^2$ .................. D06P 3/82; C09B 29/30
[58] Field of Search .......... 8/21 B, 41 B; 260/194, 260/199

[56] References Cited

UNITED STATES PATENTS

| | | | |
|---|---|---|---|
| 2,999,731 | 9/1961 | Harding | 8/54 |
| 3,352,624 | 11/1967 | Harding et al. | 8/15 |
| 3,511,829 | 5/1970 | Armento | 260/199 |
| 3,755,290 | 8/1973 | de Montmollin | 260/196 |

OTHER PUBLICATIONS

Townend, *J. Soc. Dyers and Colourists*, June 1945, pp. 144–149.
*Colour Index* (Third Edition) (*Soc. Dyers and Colourists*) vol. 4, pp. 4102–4103.

*Primary Examiner*—Harry Wong, Jr.
*Assistant Examiner*—A. L. Clingman
*Attorney, Agent, or Firm*—Curtis, Morris & Safford

[57] ABSTRACT

Process for the differential dyeing of (1) mixtures of natural or synthetic or natural and synthetic fiber materials of polyamides having polyamide fibers which can be dyed in different depths of shade, or (2) of mixtures of polyamide fibers which can be dyed in different depths of shade, with other natural or synthetic fibers, which comprises a. dyeing the said fiber materials at a temperature of from 60° to 150° C with an aqueous solution containing the red monoazo dyestuff of the formula

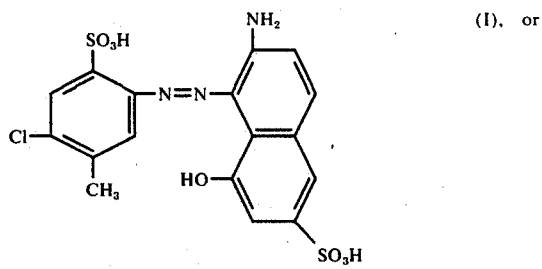

(I), or b. padding the said fiber materials at a temperature of from 20° to 60° C with a dye paste containing the above-mentioned dyestuff and subsequently steaming them at a temperature of from 100° to 150° C.

1 Claim, No Drawings

PROCESS FOR THE DIFFERENTIAL DYEING OF POLYAMIDE FIBERS AND OF MATERIALS CONTAINING THEM

The present invention relates to a process for the differential dyeing of polyamide fibers and of materials containing them.

Dyeings and prints of textile fibers which show patterns with a contrast effect or multi-tone effects are very popular. Thus, for example, great popularity is found with color patterns consisting only in light and dark shades, as may be seen in plane materials, such as carpeting, where different light and dark sections of one and the same color alternate, or which are distinguished by multi-color patterns, optionally with a different depth of shade. Color patterns of this kind can be produced by common printing methods, however, they are fairly complicated, since they have to be produced according to common methods while using different printing pastes, for example those having a different dyestuff concentration, or different dyestuffs, and optionally, while applying a multi-stage printing process with an accurate registration of the repeat of pattern.

Moreover, fashionable bicolor effects, for example, are popular, which can be produced according to common methods by weaving fibers having been dyed differently, or by dyeing mixed fabrics with dyestuffs that are different as to their technical application, such as water-soluble dyestuffs and dispersion dyes. However, these methods are considered unfavorable, since the fiber finishing is generally performed advantageously at the end of the piece production, which process permits in particular to produce any shades and patterns at any time and does not require a previous dyeing of the fibers or yarns, or storage; also, the said methods are disadvantageous as they require different multi-stage dyeing methods, whereas a single dyeing method producing such patterns would allow a more elastic and economical operation and calculation and would also easily satisfy requirements with regard to time, for example, in view of fashion, since the change of a color shade or of a pattern by means of different colors could be effected in a relatively easy and fast manner with the finished piece, by choosing the dyestuffs and the concentration of the dye baths accordingly.

Thus, attempts have long since been made to simplify the then common dyeing and printing methods, with regard to new fashionable color patterns. This objective has finally been achieved by means of the so-called "differential dyeing" process, by which it is possible to dye piece goods in one and the same dye bath, or with the same dye liquor, in one- or two-phase manner, in the desired color and color shade patterns. This dyeing process requires that the materials used to be dyed consist of mixtures of fibers or of fibers having a different structure, which can be dyed differently, if suitable dyestuffs are chosen. However, one of the difficulties to obtain attractive and clear patterns is to be seen in the fact that many of the dyestuffs which have been available up to now, or which have been considered suitable for this process, do not completely meet the requirements, in that they soil for example accompanying fibers in an undesired manner, or in that they show a sensitive reaction to slight changes of the pH value of the dye bath, or by being strongly dependent, in their differentiated dyeing power, on the dyestuff concentration in the dye bath. However, in order to offer the dyer a broad spectrum of dyestuffs with an optimum use regarding their application and shading, it has been a desirable objective to find further dyestuffs showing the required advantages as compared against the dyestuffs used so far, or filling free spaces within this spectrum.

This task has been solved by the present invention.

The present invention provides the novel and advantageous application of a dyestuff according to the "differential dyeing" process, in particular a process for the differential dyeing of mixtures of natural and/or synthetic polyamide fiber materials having components which can be dyed in different depths of shade, or of mixtures of polyamide fiber materials, preferably of those polyamide fiber materials which can be dyed in different depths of shade, with other natural and/or synthetic fiber materials, which comprises dyeing the said fiber materials with an aqueous solution or dye paste containing the yellowish red monoazo dyestuff of the formula (I)

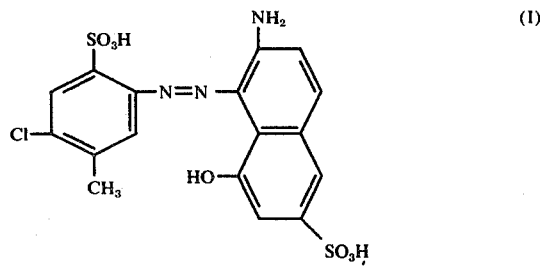

preferably in the form of its alkali metal salt, such as sodium or potassium salt, at a pH value of from 2 to 8, preferably from 4 to 7, a. at a temperature in the range of from 60° to 150° C, preferably from 70° to 125° C, or b. padding the said fiber materials at room temperature or at an elevated temperature, suitably from 20° to 60° C, and subsequently steaming them at a temperature in the range of from 100° to 150° C, preferably from 100° to 110° C.

As fiber mixtures that are suitable for this novel process, there are mentioned, for example:

Mixtures of wool fibers which can be dyed with a different depth of shade by acid dyestuffs, for example, also in the form of woven fabrics or knitted fabrics.

Fiber mixtures of wool and synthetic polyamide fibers, fiber mixtures of natural silk and synthetic polyamide fibers, fiber mixtures, for example also in the form of mixed woven fabrics or mixed knitted fabrics of polyamide-(6), polyamide-(66) and polyamide-(11) fibers, in particular fiber mixtures, for example in the form of textile fabrics, such as woven fabrics, knitted fabrics, knitted goods and carpet materials, of fiber types of synthetic polyamide-(6), polyamide-(66) and polyamide-(11) which can be dyed with a different depth of shade by acid dyestuffs and of fibers of synthetic polyamides which can be dyed by basic dyestuffs, moreover, fiber mixtures, for example also in the form of textile fabrics or woven fabrics or knitted fabrics of the above-mentioned fiber materials with other natural and/or synthetic fibers, such as polyester, polyacrylonitrile and cellulose fibers.

The manufacture of polyamide fibers which can be dyed with a different depth of shade can be effected by chemical means, for example, according to German patent specification No. 1,694,164, by increasing the number of the amino groups of the polyamide molecules by adding varying amounts of polyamines, which results in an improved capacity of being dyed by acid dyestuffs of the polyamide fibers, or on the other hand, by decreasing the number of the amino groups of the polyamide molecules, according to U.S. Pat No. 3,328,341, by adding butyrolactone during the preparation of the polyamides, which is also performed by adding varying amounts of carboxylic acids, and which results in a decreased capacity of being dyed of the fibers.

Finally, by adding aromatic dicarboxylic acids and aromatic diamines carrying a sulfonic acid group, according to U.S. Pat. Nos. 3,142,662, 3,039,990 and 3,184,436, the dyeing character of the polyamides can be converted during their preparation, by which process all amino groups are blocked and the polyamide molecules as the active dyeing groups carry only acid radicals, i.e., they can only be dyed with basic dyestuffs (cross-dyeing polyamides).

It is also possible to improve the capacity of being dyed with acid dyestuffs of polyamide fibers by purely physical means, for example by a treatment with solvents, for example with benzyl alcohol according to U.S. Pat. No. 3,467,484, or by way of suitable spinning and knitting processes.

The dyeing behavior and the technical utilization of polyamide fibers which can be dyed with a different depth of shade has been described, for example, in Melliand Textilberichte, edition 1970, pages 1189 – 1197, and in the pattern card No. 8163 (polyamide carpets) of the Farbwerke Hoechst Aktiengesellschaft.

The application of the dyestuff of the formula (I) on the above-mentioned fiber naterials can be effected while using the technically common dyeing auxiliaries, and the said dyestuff yields on polyamide fibers to be dyed with acid dyestuffs clear yellowish red dyeings of a very different depth of shade, depending on the polyamide fiber type present, already a very light color shade having an excellent fastness to light.

Besides, the dyeings show a good fastness to rubbing, a good fastness to sea water and to water (according to DIN 54006). Due to its good migration behavior, the dyestuff of the invention yields very even dyeings on the individual polyamide fiber types.

The dyestuff of the formula (I) shows, with a good build-up, an excellent differentiating behavior from the acid to the neutral pH range, due to which the desired strong differences in the depth of shade are obtained in a constant manner for the individual polyamide fiber types specified above, also in the pH range between 4 and 7. Owing to this property, the application of the dyestuff is facilitated, in particular in the case of the continuous batchwise exhaustion methods, wherein the dye bath has to be constantly made up, depending on the consumption, and its pH value needs to be controlled and corrected all the time, in order to obtain the desired effect, namely, the different dyeing of the individual types of fiber.

If the dyestuff of the formula (I) is used for the dyeing of polyamide or polyamide fiber-containing materials comprising fibers to be dyed by cationic dyestuffs and/or polyester fibers, the latter remain undyed in all cases. Due to its good compatibility with other dyestuffs, the dyestuff of the formula (I) can be used together with dyestuffs of other types, for example, with dispersion dyestuffs and/or basic dyestuffs. In order to adjust special color shades, the dyestuff may also be combined with further acid dyestuffs.

The slightly yellowish red monoazo dyestuff of the formula (I) used according to the invention can be prepared by coupling equal molar amounts of diazotized 4-chloro-5-methylaniline-2-sulfonic acid of the formula (II)

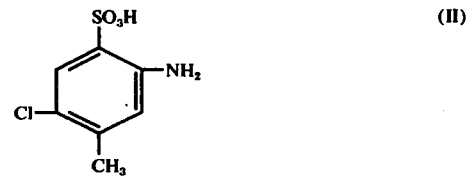

and 2-amino-8-naphtol-6-sulfonic acid of the formula (III)

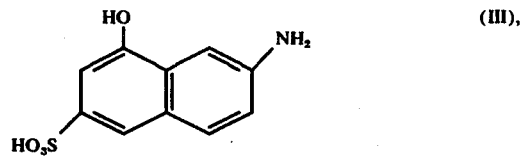

at a pH value in the range of from 2 to 4. It can be obtained by being salted out of the reaction solution or by evaporation or spray-drying of this coupling solution.

In the "differential dyeing" process the dyestuff used in the process of the invention shows a good color build-up even up to the neutral range, as compared against the dyestuffs C.I. Acid Red 37 and C.I. Acid Red 42 known from "Colour Index," and also has a very good differentiating behavior, i.e., it can yield dyeings having wide differences in the depth of shade, depending on the type of polyamide fiber, while leaving a complete share of undyed polyester and cellulose portions of the fiber mixture possibly present which can be dyed only with cationic dyestuffs. Furthermore, the migrating behavior of the dyestuff to be used according to the invention is superior to that of C.I. Acid Red 42, which results in a high degree of evenness of the dyeings obtained with the dyestuff used according to the invention. Streaky or otherwise irregular dyeings on the individual types of polyamide fiber have not been observed. Moreover, the dyestuff used according to the invention shows an excellent fastness to light, already with dyeings of a very light color shade, as compared against the dyestuffs C.I. Acid Red 37 and 42.

The following Examples serve to illustrate the use of the dyestuff of the formula (I) in accordance with the invention. The parts by weight are to the parts by volume as is the gram to the ccm.

EXAMPLE 1

0.66 Part of the dyestuff of the formula (I) was dissolved in 1000 parts by weight of water and was mixed with 1 part by weight each of mono- and trisodium phosphate. 33 Parts by weight of a polyamide carpet material comprising a light dyeing type of polyamide fiber, a regular dyeing type, a deep dyeing type, as well as a type of polyamide fiber which could not be dyed with acid dyestuffs, were dyed for 1 hour at a temperature in the range of from 70° to 95° C, the pH value being established at 6.5 to 7. The same dye bath yielded fibers dyed with very different shades of red, as well as a fiber portion which had not been dyed at all. Already at the lightest color shade, the dyeings showed an excellent fastness to light, a good fastness to rubbing, a good fastness to sea water and a good fastness to water according to DIN 54006.

As a light dyeing type of polyamide fiber there is used, in the present case, for example the fiber of duPont labelled nylon 66-type 845, as a regular or normal dyeing type, for example the fiber of duPont labelled nylon 66-type 846, and as a deep dyeing type, for example the fiber of duPont labelled nylon 66-type 847.

EXAMPLE 2

A dye bath was prepared consisting of 0.66 part by weight of the dyestuff of the formula (I), 1000 parts by volume of water and 1 part by volume of acetic acid of 60 % strength, and the carpet material used in Example 1 was dyed for 1 hour at a temperature in the range of from 70° to 95° C, the pH value being established at 4 to 4.5. The dyeing result was the same as has been described in Example 1.

EXAMPLE 3

0.8 Part by weight of the dyestuff of the formula (I) was dissolved in 1000 parts by weight of water, and 1 part by weight each of mono- and trisodium phosphate were added. In this dye bath 4 hanks of 10 parts by weight each of a polyamide endless yarn were dyed for 1 hour at 95° C, the yarn comprising a light dyeing type of fiber, a regular dyeing type, a deep dyeing type and a type of fiber which could not be dyed at all with acid dyestuffs. Yarn hanks were obtained which showed an even red dyeing, however, of a very different depth of shade, as well as a hank that had not been dyed at all. Already at a very light color shade, the dyeings showed an excellent fastness to light, to rubbing, to sea water and to water according to DIN 54006, as well as a high evenness due to the good migration behavior of the dyestuff.

EXAMPLE 4

A dye bath was prepared consisting of 0.8 part by weight of the dyestuff of the formula (I), 1000 parts by volume of water and 1 part by volume of acetic acid of 60 % strength, in which bath 4 hanks of 10 parts by weight each of a polyamide carpet yarn were dyed at 95° C for 1 hour, the yarn comprising a light dyeing type of fiber, a regular dyeing type, a deep dyeing type, as well as a type of fiber that could not be dyed at all with acid dyestuffs. The yarn hanks thus obtained showed a red dyeing of a very different depth of shade; the hank which could not be dyed with acid dyestuffs remained completely undyed. The dyeings showed the good fastness properties described in Example 1 and a high evenness which was to be attributed to the good migration behavior of the dyestuff.

EXAMPLE 5

Tufted carpet material containing polyamide fibers with a different affinity towards acid dyestuffs was impregnated with 5 times the amount by weight of an aqueous padding liquor containing in 100 parts by weight 1 part by weight of the dyestuff of the formula (I), 0.1 part by volume of acetic acid of 60 % strength, 0.3 part by weight of a wetting agent on the basis of alkylpolyglycolether, as well as 0.4 part by weight of a thickening agent on the basis of starch ether. The fabric was steamed for 5 minutes at a temperature in the range of from 100° to 103° C and was washed with warm water. The dyed tufted carpet material showed a clear red dyeing of a very different depth of shade. The portion of polyamide fibers to be dyed with basic dyestuffs remained completely undyed. The dyeing showed the good fastness properties which have been described, for example, in Example 1.

EXAMPLE 6

Tufted carpet material containing polyamide fibers to be dyed with basic dyestuffs and those having a different affinity towards acid dyestuffs, was padded with 5 times the amount by weight of the padding liquor described in Example 5, to which 1 part by weight of C.I. Basic Yellow 21 as well as 0.1 part by weight of a dispersing agent on the basis of an oxethylated condensation product on the basis of cresol and camphene were added. The impregnated tufted carpet material was subsequently steamed for 10 minutes at a temperature of from 100° to 103° C, was rinsed with water and dried. A material was obtained which was distinguished from that described in Example 5 by the fact that those portions of the fiber which had formerly not been dyed at all now showed an intensive yellow dyeing.

EXAMPLE 7

0.33 Part by weight of the dyestuff of the formula (I), 0.5 part by weight of a levelling agent on the basis of a condensation product of cyanuric chloride and anilinesulfonic acid, 0.2 part by weight of a textile auxiliary on the basis of an oxethylated fatty amine, as well as 1.5 parts by weight of mono- and 0.2 part by weight of disodium phosphate were dissolved in 1000 parts by volume of water. 33 Parts by weight of a woven fabric consisting of several types of polyamide fiber which could be dyed in a different depth of shade were given into this dye bath and were dyed for 1 hour at 70° C. The fabric was then removed from the bath and was washed with cold water. It showed a red dyeing with several different depths of shade, of which even the lightest shades showed a good fastness to light. If the fabric contained portions of polyamide fibers which could not be dyed with acid dyestuffs, they remained undyed according to the described dyeing process.

EXAMPLE 8

5 Parts by weight of a mixture of wool fibers having an increased dyestuff-absorbing capacity and normal untreated wool fibers were placed into a dye bath consisting of 0.15 part by weight of the dyestuff of the formula (I), 125 parts by weight of water and 0.15 part by volume of acetic acid of 60 % strength, were heated at 70° C for 30 minutes, while being moved well in the bath, and were dyed for 1 hour at this temperature. The wool mixture was then removed from the dye bath, was rinsed with cold water and dried. A mixture of 2 types of wool fiber which had been dyed in a slightly yellowish red with different depths of shade were obtained, the dyeing showing a good fastness to light.

EXAMPLE 9

0.66 Part by weight of the dyestuff of the formula (I) and 0.33 part by weight of the dyestuff C.I. Basic Yellow 21 were dissolved in 1000 parts by volume of water, 0.5 part by volume of acetic acid of 60 % strength, 1 part by weight of sodium acetate and 0.5 part by weight of an oxethylated condensing agent on the basis of cresol and camphene. 33 Parts by weight of a mixture of polyamide6, polyamide66 and polyacrylonitrile fibers were added and were dyed for 1 hour at a temperature in the range of from 90° to 95° C. The fabric was rinsed with warm and cold water and was dried. The fabric showed a red dyeing of very different depths of shade, and the portion of polyacrylonitrile fibers showed a clear yellow dyeing.

EXAMPLE 10

A dye bath was prepared as has been described in Example 5, and 33 parts by weight of a fabric consisting of several types of polyamide fiber to be dyed with acid and basic (cationic) dyestuffs were dyed in this liquor. The result of the dyeing was similar to that of Example 9, namely, a red dyeing was obtained on those polyamide fibers which could be dyed with acid dyestuffs, the dyeing having very different depths of shade, depending on the affinity of the fiber towards acid dyestuffs, and the polyamide fibers to be dyed with cationic dyestuffs showed a clear yellow dyeing.

EXAMPLE 11

A carpet material of polyamide fibers having a different affinity towards acid dyestuffs was impregnated with 5 times the amount by weight of an aqueous dye bath containing 1 part by weight of the dyestuff of the formula (I), 0.1 part by volume of acetic acid of 60 % strength, 0.3 part by weight of wetting agent on the basis of alkylpolyglycolether as well as 0.4 part by weight of a thickening agent on the basis of starch ether, in 100 parts by weight of liquor. The fabric was subsequently steamed for 5 minutes at a temperature of from 100° to 103° C and was washed with warm water. The resulting fabric was dyed in a clear red color of very different depths of shade, the portion of fibers to be dyed with basic dyestuffs having remained undyed.

EXAMPLE 12

The mixed fabric used in Example 11 was padded with the padding liquor also described in Example 11, to which 1 part by weight of the dyestuff C.I. Basic Yellow[21] had been added, amd was squeezed off, so that the fabric was impregnated with 5 times the amount by weight of the padding liquor. Then the fabric was steamed for 10 minutes with saturated steam and was subsequently rinsed with water and dried. A fabric was obtained which was distinguished from that which was treated according to Example 11 by the fact that those portions of the fabric which had remained undyed in Example 11 now showed an intensive yellow dyeing.

EXAMPLE 13

0.06 Part by weight of the dyestuff of the formula (I) was dissolved in 1000 parts by volume of water and mixed with 1 part by volume of acetic acid of 60 % strength. 3 Hanks of polyamide endless yarn of polyamide6, polyamide66 and polyamide-11 types of fiber having 10 parts by weight each were dyed in this bath for 1 hour at a temperature in the range of from 95° to 100° C. After the dyeing process the hanks were rinsed with cold water and dried. According to this operating method, the same bath yielded polyamide fibers with a red dyeing of very different depths of shade, the polyamide-6 fibers showing the deepest, and the polyamide-11 fiber showing the lightest dyeing.

EXAMPLE 14

A carpet material on the basis of polyamide fibers which could be dyed partly with acid, and partly with basic dyestuffs was impregnated with 4 times the amount of a padding liquor containing 10 parts by weight of the dyestuff of the formula (I), 5 parts by weight of C.I. Acid Red 42, 4 parts by weight of a thickening agent on the basis of cellulose ether and 2 parts by weight of monosodium phosphate, in 1000 parts by weight of liquor. For the fixation of the dyestuffs, the impregnated fabric was steamed for 8 minutes and was subsequently washed with warm water and dried. After this treatment the mixed fabric showed a red dyeing of different depths of shade, and even the portion of fibers which could not be dyed with acid dyestuffs showed some traces of red. This unfavorable effect was to be attributed to the use of the dyestuff C.I. Acid Red 42, as was found by a comparison with Example 11.

EXAMPLE 15

0.5 Part by weight of the dyestuff of the formula (I), 0.5 part by weight of C.I. Acid Red 42, 0.5 part by weight of acetic acid of 60 % strength and 1 part by weight of sodium acetate were made up to 1000 parts by weight with water having a temperature of 70° C. Four Hanks of polyamide staple fibers of 8 parts by weight each were dyed in this dye bath, which fibers had a different affinity (capacity of being dyed) towards acid dyestuffs, while one type of fiber was not to show any affinity at all. The hanks were dyed for 1 hour at a temperature of from 90° to 95° C while being moved well in the liquor and subsequently they were washed. Thus, a red dyeing of different depths of shade was obtained on all types of polyamide fiber, in which process the type of fiber not to be dyed with acid dyestuffs also showed traces of red. This unfavorable effect was a consequence of the use of the dyestuff C.I. Acid Red 42, which could be seen by comparing this result with that of Example 4.

EXAMPLE 16

An aqueous dye liquor was prepared which contained 0.66 part by weight of the dyestuff of the formula (I), 1 part by weight of a dispersing agent on the basis of a condensation product of naphthalene-sulfonic acid and formaldehyde, 0.5 part by weight of a levelling agent on the basis of an oxethylated fatty amine, 0.5 part by volume of acetic acid of 60 % strength and 1 part by weight of sodium acetate, in 1000 parts by weight of liquor. 33 Parts by weight of a mixed fabric consisting of polyester fibers and polyamide66 fibers were dyed in this bath in a closed dyeing vessel for 15 minutes at 125° C, the fibers consisting of those types of fiber which could be dyed in normal and deep color shades with acid dyestuffs. A mixed fabric was obtained which showed a clear red dyeing in two different depths of shade and, besides, also undyed fiber portions. The fabric was now divided into 2 parts, one of which was dyed for another 20 minutes at 125° C, after 0.33 part by weight of C.I. Disperse Yellow 64 had been added to the dye bath. The part of the mixed fabric thus after-treated showed a yellowish red dyeing with 2 different depths of shade besides those portions which had been dyed purely yellow.

The same result was obtained in a single step, if the mixed fabric was dyed with a mixture of the two dyestuffs mentioned above, at a temperature of from 125° to 130° C.

EXAMPLE 17

A mixed fabric on the basis of polyamide fibers having a different dyestuff pick-up capacity and cellulose fibers was impregnated with 3 times the amount of a padding liquor containing 10 parts by weight of the dyestuff of the formula (I), 5 parts by weight of C.I. Direct Yellow 11, 5 parts by weight of a cotton mordant on the basis of stoved phenol, 4 parts by weight of a thickening agent on the basis of cellulose ether, and 1.6 parts by weight of tri-sodium phosphate and 0.6 part by weight of monosodium phosphate, in 1000 parts by weight of liquor. The fixation of the dyestuff was effected by steaming the fabric for 15 minutes at a temperature of from 100° to 103° C. The steamed fabric was rinsed with warm water and was soaped and dried. A mixed fabric was obtained, the polyamide portion of which showed a red dyeing in different depths of shade, whereas the cellulose fiber portion had been dyed yellow.

EXAMPLE 18

A dye bath was prepared which contained 0.5 part by weight of C.I. Reactive Yellow 15, 2 parts by weight of trisodium-phosphate and 5 parts by weight of sodium sulfate in 100 parts by weight. 10 Parts by weight of a mixed fabric comprising polyamide and viscose staple fibers which could be dyed with a different depth of shade were dyed in this bath for 1 hour at a temperature of from 60° to 70° C. Subsequently the pH value of the dye bath was adjusted to 5 or 6 by means of acetic acid of 60 % strength, 0.5 part by weight of the dyestuff of the formula (1) was added, and the dyeing was continued for another hour at the same temperature. A fabric was obtained, the polyamide portion of which had been dyed in different shades of red, and whose viscose staple fiber portion had been dyed in a yellow color shade.

EXAMPLE 19

A mixed fabric comprising polyamide fibers which could be dyed by acid dyestuffs with light and deep color shades, and poly-acrylonitrile fibers was impregnated with three times the amount by weight of an aqueous dye liquor containing — in 100 parts by weight of liquor — 1 part by weight of the dyestuff of the formula (1), 1 part by weight of C.I. Basic Yellow 21, 0.3 part by weight of a wetting agent on the basis of alkylpolyglycolether, 0.1 part by weight of a dispersing agent on the basis of an oxethylated condensing agent on the basis of cresol and camphene, 0.4 part by weight of a thickening agent on the basis of starch ether, as well as 0.2 part by weight of monosodium-phosphate. The fabric was steamed for 8 minutes at a temperature of from 100° to 103° C, and the dyeing was washed with warm water. A fabric was obtained, the polyamide portion of which had been dyed in two different shades of red, and whose polyacrylonitrile portion had been dyed in a yellow shade.

EXAMPLE 20 a. A dye bath was prepared which consisted of 600 ml of water, 0.1 g of the dyestuff of the formula (I), 0.4 g of a commercial textile auxiliary on the basis of a condensation product of cyanuric chloride and aniline-sulfonic acids as well as 0.06 g of a textile auxiliary of a long-chain aliphatic primary amine and ethylene oxide, and 2 hanks of nylon-(66) carpet yarn having 10 g each of the types 846 and 847 (regular dyeing and deep dyeing nylon from Du Pont) were dyed in the said bath for 1 hour at 95° C. During the entire dyeing process, a pH value of 6.5 was maintained by way of the buffer system of mono- and disodium-phosphate.

Subsequently the dyeings were rinsed with warm water and were dried at the air. The two hanks thus dyed show a wide difference in color intensity.

b. If the dyeing was carried out according to the same method as described under (a) above, however, while using 0.1 g of the dyestuff Acid Red 42 instead of the dyestuff of the formula (I), two differently dyed yarn hanks were also obtained, but the difference in color depth was not nearly as wide as in the above case.

This Example shows clearly that the differentiating capacity of the dyestuff used according to the invention on differential-dyeing nylon was markedly superior to that of Acid Red 42.

We claim:
1. Process for the differential dyeing of (1) mixtures of natural or synthetic or natural and snythetic fiber materials of polyamides having polyamide fibers which can be dyed in different depths of shade, or (2) of mixtures of polyamide fibers which can be dyed in different depths of shade, with other natural or synthetic fibers, which comprises
   a. dyeing the said fiber materials at a temperature of from 60° to 150° C with an aqueous solution containing the red monoazo dyestuff of the formula

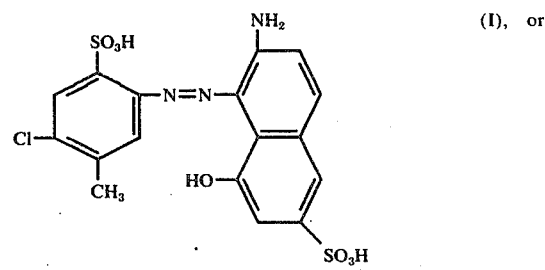

(I), or b. padding the said fiber materials at a temperature of from 20° to 60° C with a dye paste containing the above-mentioned dyestuff and subsequently steaming them at a temperature of from 100° to 150° C.

* * * * *